(12) United States Patent
Du et al.

(10) Patent No.: US 11,128,238 B2
(45) Date of Patent: Sep. 21, 2021

(54) WHEEL AND CYCLE

(71) Applicant: BOE Technology Group Co., Ltd., Beijing (CN)

(72) Inventors: Zhihong Du, Beijing (CN); Kai Lin, Beijing (CN); Wenbo Li, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 395 days.

(21) Appl. No.: 16/200,713

(22) Filed: Nov. 27, 2018

(65) Prior Publication Data

US 2019/0296609 A1 Sep. 26, 2019

(30) Foreign Application Priority Data

Mar. 20, 2018 (CN) .......................... 201820380847.0

(51) Int. Cl.

| H02N 1/04 | (2006.01) |
|---|---|
| H02N 1/00 | (2006.01) |
| H02K 7/18 | (2006.01) |
| H02K 11/00 | (2016.01) |
| B62J 6/06 | (2006.01) |
| B62J 99/00 | (2020.01) |
| B62J 45/00 | (2020.01) |

(52) U.S. Cl.
CPC ............. *H02N 1/04* (2013.01); *H02K 7/1846* (2013.01); *H02K 11/0094* (2013.01); *H02N 1/00* (2013.01); *B62J 6/06* (2013.01); *B62J 45/00* (2020.02); *B62J 99/00* (2013.01)

(58) Field of Classification Search
CPC .. H02N 1/04; H02N 1/00; H02N 1/12; H02N 1/06; H02N 1/08; H02N 1/10; H02N 1/002; H02N 1/004; H02N 1/006; H02N 1/008; H02K 7/1846; H02K 11/0094; B62J 99/00

USPC ......................................... 310/310, 309, 308
See application file for complete search history.

(56) References Cited

U.S. PATENT DOCUMENTS

| 5,667,233 A * | 9/1997 | Metzinger ................ B62L 1/00 280/212 |
|---|---|---|
| 10,011,222 B1 * | 7/2018 | Wu .......................... F21S 9/04 |
| 2014/0338458 A1 * | 11/2014 | Wang ..................... G01H 11/06 73/658 |
| 2015/0061464 A1 * | 3/2015 | Park ....................... H02N 2/186 310/329 |
| 2015/0307157 A1 * | 10/2015 | Gao ....................... F16H 61/702 701/52 |
| 2016/0096493 A1 * | 4/2016 | Suzuki .................... B62M 6/45 320/162 |

(Continued)

FOREIGN PATENT DOCUMENTS

JP  2016088473 A  *  5/2016  ........... B60C 23/064

OTHER PUBLICATIONS

Harada et al, Tire Assembly, May 23, 2016, Denso Corp, JP 2016088473 (English Machine Translation) (Year: 2016).*

*Primary Examiner* — Quyen P Leung
*Assistant Examiner* — Alexander A Singh
(74) *Attorney, Agent, or Firm* — Arent Fox LLP; Michael Fainberg

(57) ABSTRACT

The disclosure relates to the field of cycle technologies, and particularly to a wheel and a cycle. The wheel comprises a rim, a tire covering an outer periphery face of the rim, and a friction power device sandwiched between the rim and the tire; wherein the friction power device can produce a frictional current when pressed by the rim and/or the tire.

14 Claims, 3 Drawing Sheets

(56) References Cited

U.S. PATENT DOCUMENTS

2018/0205327 A1\* 7/2018 Wu .................... B60C 19/00

\* cited by examiner

WHEEL AND CYCLE

CROSS-REFERENCE TO RELATED APPLICATION

This application claims priority of Chinese Patent Application No. 201820380847.0, filed on Mar. 20, 2018, which is hereby incorporated by reference in its entirety.

FIELD

The disclosure relates to the field of cycle technologies, and particularly to a wheel and a cycle.

BACKGROUND

With the publicity of the green and environmental protection concept as well as the great spreading and popularization of the shared bikes in the city, the cycle riding gradually becomes a kind of popular relaxation form and transport mode. Simultaneously, with the general improvement of the social life level, the requirement of the people on the comfortability of the cycle is increasingly high, and particularly in the field of sports cycle, the cycle using the electrical transmission to change the speed electrically has become a kind of standard configuration of the competitor. The electrical transmission has many advantages, such as: automatic adjustment without debugging, programmable settings of speed changing habit, precision of speed changing and the like.

BRIEF SUMMARY

The disclosure provides the following technical solutions.

A wheel includes a rim and a tire covering an outer periphery face of the rim;
 the above wheel further includes a friction power device sandwiched between the rim and the tire; wherein the friction power device can produce a frictional current upon being pressed by at least one of the rim and the tire.

Optionally, the friction power device includes a first power generating unit and a second power generating unit arranged in a stack along a radial direction of the rim, wherein the first power generating unit is fixedly connected to the outer periphery face of the rim facing the tire.

Optionally, the first power generating unit includes a first power generating layer; or the first power generating unit includes a first power generating layer and a first conductive layer arranged between the first power generating layer and the rim, and the first conductive layer is configured to fixedly connect the first power generating layer with the rim;
 the second power generating unit includes a second power generating layer and a second conductive layer arranged in a stack along the radial direction of the rim, and the second power generating layer frictionally contacts with the first power generating layer.

Optionally, the wheel further includes a hub which is coaxial to the rim, spokes and a conductive slip ring;
 the conductive slip ring has a rotor and a stator, wherein the stator is fixedly installed to the hub, and a shaft axis of the rotor overlaps with a shaft axis of the hub;
 the friction power device is electrically connected with the conductive slip ring.

Optionally, the spokes are insulated from the rim;
 the first power generating unit is electrically connected with the stator via the rim, and the second power generating unit is electrically connected with the rotor via the spokes.

Optionally, both the first power generating layer and the second power generating layer are made from the high polymer materials.

Optionally, the high polymer materials are at least one of polydimethylsiloxane, silicon gel, polyurethane or polytetrafluoroethylene.

Optionally, the tire includes an outer tube and an inner tube.

Furthermore, the disclosure further provides a cycle, which includes an electrical transmission and further includes any wheel provided by the above technical solutions, where the wheel includes a friction power device which is electrically connected with the electrical transmission and configured to supply the electric energy to the electrical transmission.

Optionally, the cycle further includes an energy storing device electrically connected between the friction power device and the electrical transmission, where the energy storing device is configured to store the electric energy produced by the friction power device.

Optionally, the energy storing device is a capacitance.

DETAILED DESCRIPTION OF THE EMBODIMENTS

The technical solutions in the embodiments of the disclosure will be described clearly and completely below in combination with the accompanying drawings in the embodiments of the disclosure. Obviously the described embodiments are only a part of the embodiments of the disclosure but not all the embodiments. Based upon the embodiments of the disclosure, all of other embodiments obtained by those ordinary skilled in the art without creative work pertain to the protection scope of the disclosure.

The embodiments of the disclosure provide a wheel and a cycle, where the wheel is provided with the friction power device sandwiched between the rim and the tire, and the friction power device can produce the frictional current under the pressing of the rim and/or the tire, to thereby form the electric energy. Therefore, the cycle using such wheel can address the drawback that the existing cycle cannot supply the electric energy to the electrical transmission, the cycle light or other electric appliances. The above cycle can be the ordinary bicycle, tricycle or sports bicycle or any other cycle which is moved by the manpower, or can be the electric cycle or any other assistance cycle with the wheels for riding.

Figure 1:
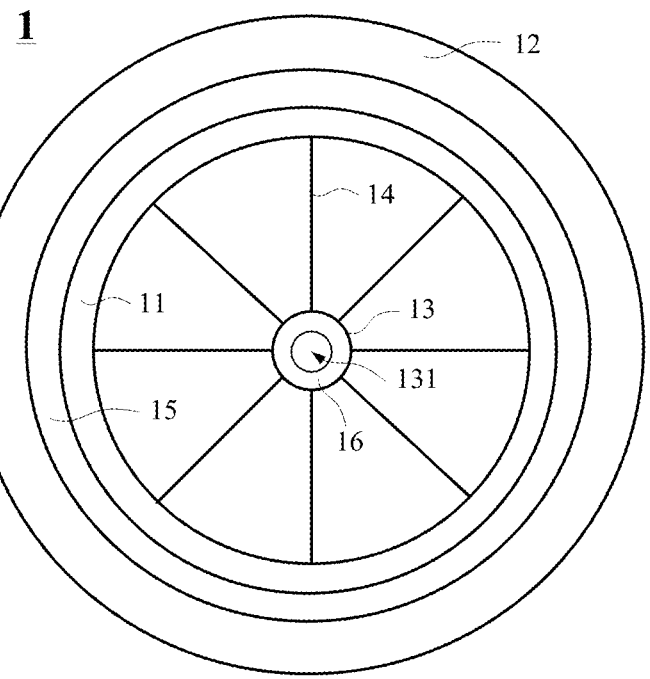
FIG. 1 is a structural schematic diagram of a wheel provided by an embodiment of the disclosure.
Figure 2:
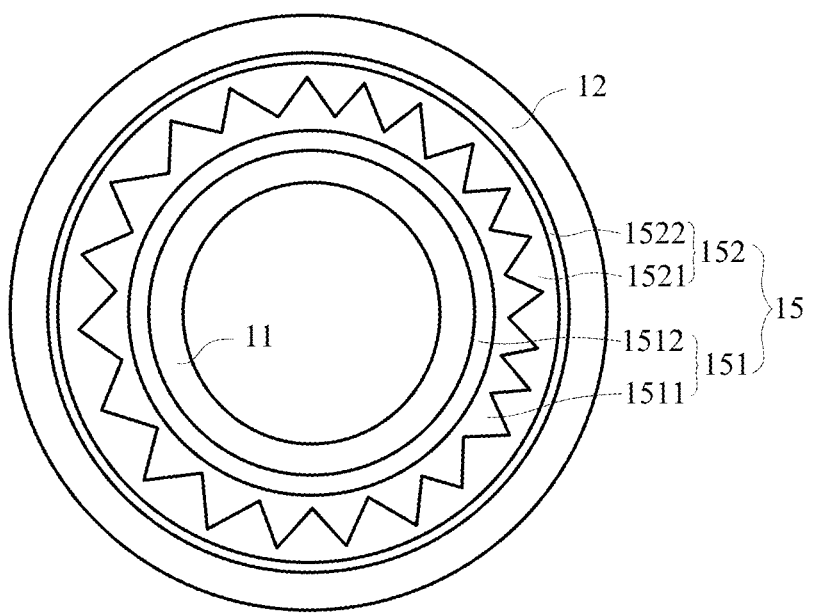
FIG. 2 is a structural schematic diagram of a friction power device of the wheel provided in FIG. 1.
Figure 3:
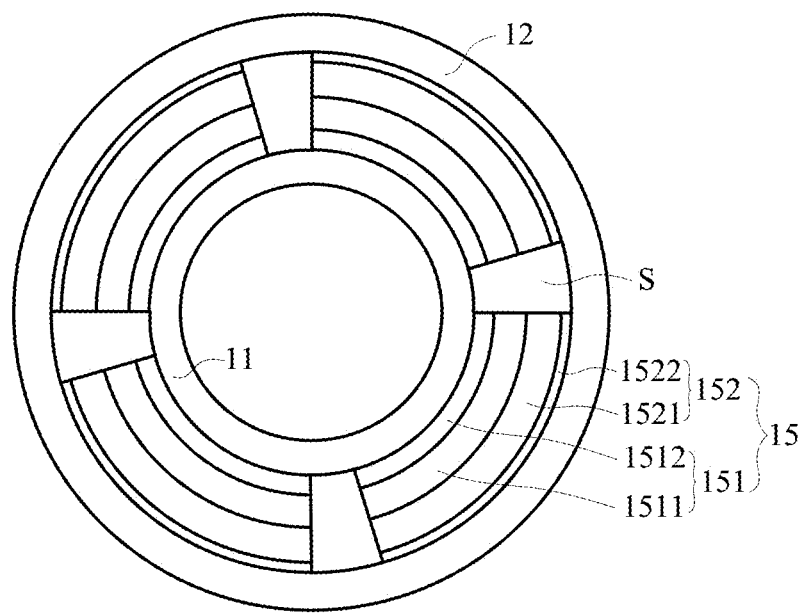
FIG. 3 is a structural schematic diagram of another friction power device of the wheel provided in FIG. 1.
Figure 4:
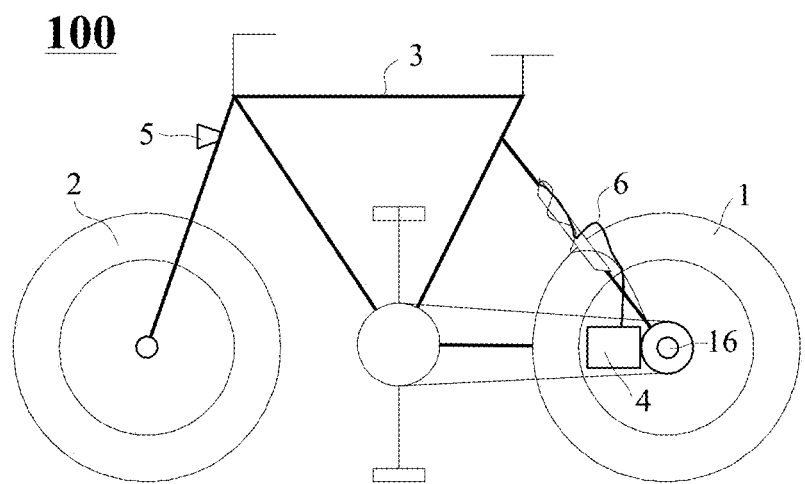
FIG. 4 is a structural schematic diagram of a cycle provided by an embodiment of the disclosure.

Here, referring to FIGS. 1, 2 and 3, an embodiment of the disclosure provides a wheel 1 which includes a rim 11 and a tire 12 covering the outer periphery face of the rim 11; as shown in the structure of FIG. 1, the above wheel 1 can further include a hub 13 which is coaxial to the rim 11 and spokes 14 installed between the rim 11 and the hub 13; as shown in the structure of FIG. 4, the cycle 100 can include the above wheel 1 (i.e., rear wheel), a front wheel 2, a cycle frame 3, an electrical transmission 4 and a cycle light 5, and further include a chain, pedals, a handlebar, a saddle or other parts; and the hub 13 is provided with a through hole 131 which can go through the axle.

The above wheel 1 further includes a friction power device 15 sandwiched between the rim 11 and the tire 12; and the friction power device 15 can produce the frictional current when pressed by the rim 11 and/or the tire 12. As shown in the structures of FIGS. 1, 2 and 3, the friction power device 15 is sandwiched between the rim 11 and the tire 12 of the wheel 1; the friction power device 15 can include a first power generating unit 151 and a second power generating unit 152 arranged in a stack; the tire 12 can include an outer tube and an inner tube, or can be provided with only the outer tube. As shown in the structure of FIG. 2, along the circumference of the wheel 1, the friction power device 15 is the continuous structure arranged between the rim 11 and the tire 12, that is, the wheel 1 is provided with one friction power device 15 which is a ring structure; or as shown in the structure of FIG. 3, along the circumference of the wheel 1, the friction power device 15 is the discontinuous structure arranged between the rim 11 and the tire 12, and the gaps S are arranged among the friction power devices 15, that is, the wheel 1 is provided with four friction power devices 15. However, the wheel 1 can also be provided with two, three or more friction power devices 15, and when a plurality of friction power devices 15 are arranged, the sizes of the friction power devices 15 between the rim 11 and tire 12 can be the same or can be set randomly, and they can be distributed uniformly or can be distributed randomly.

Since the above wheel 1 is provided with the friction power device 15 sandwiched between the rim 11 and the tire 12, when the cycle 100 is in the riding state, the wheel 1 is in the rolling state, the tire 12 contacts with the ground surface or road surface, the weight of the cycle 100, rider or load is applied on the wheel 1, both the rim 11 and the tire 12 are pressed, and thus the rim 11 and/or the tire 12 will press the friction power device 15 sandwiched between them. The friction materials in the friction power device 15, when pressed, produce the friction and form the frictional current to produce the electric energy, so that the electrical transmission 4, the cycle light 5 or other electric appliances of the cycle 100 can be charged or supplied with the electric energy, to address the drawback that the existing cycle 100 cannot supply the electric energy to the electrical transmission 4.

Therefore, the wheel 1 can produce the frictional current through the added friction power device 15, so the cycle 100 using such wheel 1 can address the drawback that the existing cycle 100 cannot supply the electric energy to the electrical transmission 4, the cycle light 5 or other electric appliances.

In an optional embodiment, as shown in the structures of FIGS. 2 and 3, the friction power device 15 includes a first power generating unit 151 and a second power generating unit 152 arranged in a stack along the radial direction of the rim 11, where the first power generating unit 151 is fixedly connected to the outer periphery face of the rim 11 facing the tire 12. The first power generating unit 151 can be fixedly connected to the outer periphery face of the rim 11 in the adhesive or another way, or the friction power device 15 can be clamped between the tire 12 and the rim 11 through the tire 12.

The above friction power device 15 includes the first power generating unit 151 and the second power generating unit 152 arranged in a stack. In the rotation process of the wheel 1, the tire 12 may be pressed and the pressure is successively passed to the friction power device 15 and the rim 11. The first power generating unit 151 and the second power generating unit 152 of the friction power device 15 are pressed by the rim 11 and the tire 12 simultaneously. Under the action of the pressure of the rim 11 and/or tire 12, the first power generating unit 151 and the second power generating unit 152 will produce the deformation and the relative displacement, so that the friction occurs between the first power generating unit 151 and the second power generating unit 152, to thereby form the frictional charges and the frictional current.

Optionally, the first power generating unit 151 can include only a first power generating layer 1511, or can include a first power generating layer 1511 and a first conductive layer 1512 arranged between the first power generating layer 1511 and the rim 11, and when the first power generating unit 151 is provided with the first conductive layer 1512, the first conductive layer 1512 is configured to fixedly connect the first power generating layer 1511 with the rim 11.

The second power generating unit 152 includes a second power generating layer 1521 and a second conductive layer 1522 arranged in a stack along the radial direction of the rim 11, and the second power generating layer 1521 frictionally contacts with the first power generating layer 1511.

In a use process, the charges are generated by the relative friction between the first power generating layer 1511 and the second power generating layer 1521, and converge to form a current; of course, the current can also be generated in other power generating ways.

The first power generating layer 1511 and the second power generating layer 1521 described above can be made from the high polymer materials, which can be polydimethylsiloxane, silicon gel, polyurethane and polytetrafluoroethylene (PTFE) or other materials. Also the first power generating layer 1511 and the second power generating layer 1521 described above can be made from any other materials which enable the friction power generation, and not limited to the above-mentioned high polymer materials. As shown in the structures of FIGS. 2 and 3, the surface of the first power generating layer 1511 facing the second power generating layer 1521 can be a cambered structure, or can be a wavy-shaped surface or another irregular surface. Similarly, the surface of the second power generating layer 1521 facing the first power generating layer 1511 matches with the surface of the first power generating layer 1511, and can also be a cambered structure or an irregular surface structure.

Meanwhile, both the first power generating layer 1511 and the second power generating layer 1521 can be made from iron, steel, aluminum, copper or any other conductive materials.

In order to turn on the charges produced by the friction power device 15 in real time, as shown in the structures of FIGS. 2 and 3, the first power generating unit 151 can further include the first conductive layer 1512 arranged between the first power generating layer 1511 and the rim 11, where the first conductive layer 1512 is configured to fixedly connect the first power generating layer 1511 with the rim 11 and to transport the electric energy produced by the first power generating layer 1511 outside through the first conductive layer 1512 and the rim 11.

Figure 5:
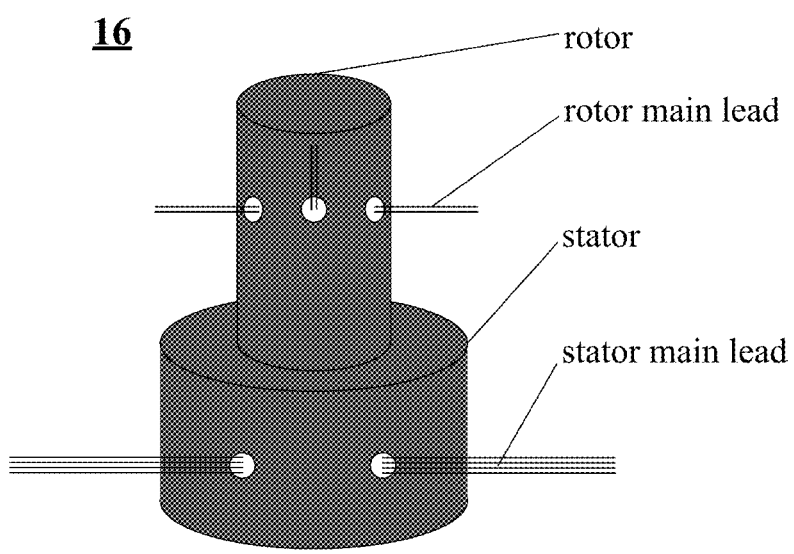
FIG. 5 is a structural schematic diagram of a conductive slip ring of the wheel provided in FIG. 1.

In order to enable the current produced by the friction power device 15 to be continuously imported into the electric appliances of the cycle 100, the above wheel 1 can further include a hub 13 which is coaxial to the rim 11, spokes 14 installed between the rim 11 and the hub 13, and a conductive slip ring 16. As shown in the structures of FIG. 5, the conductive slip ring 16 has a rotor and a stator, where the stator is fixedly installed to the hub 13, and the shaft axis of the rotor overlaps with the shaft axis of the hub 13.

The friction power device 15 is electrically connected with the conductive slip ring 16.

Since the conductive slip ring 16 is provided with the stator and the rotor, it can be conductive when rotating. By the relative rotation of the stator and the rotor in the conductive slip ring 16, the electric energy produced by the friction power device 15 can be imported into the electric appliances successfully, which can prevent the drawback of wire winding due to the rotation of the wheel 1 and thus can ensure the operation reliability and stability of the friction power device 15 and the cycle 100.

In order to simplify the conductive structure, the spokes 14 are insulated from the rim 11.

The first power generating unit 151 is electrically connected with the stator via the rim 11, and the second power generating unit 152 is electrically connected with the rotor via the spokes 14, so that the electric energy produced by the friction power device 15 can be electrically connected with the conductive slip ring 16 via the rim 11 and the spokes 14 respectively.

Since the spokes 14 are insulated from the rim 11, the first power generating unit 151 is electrically connected with the stator via the rim 11, and the second power generating unit 152 is electrically connected with the rotor via the spokes 14, the friction power device 15 can be in communication with the positive and negative poles via the rim 11 and the spokes 14 respectively, and electrically connected with the conductive slip ring 16 via the rim 11 and the spokes 14 respectively, to be in communication with the positive and negative poles of the electrical transmission 4, the cycle light 5 or other electric appliances of the cycle 100 via the conductive slip ring 16 and to supply power to the electric appliances.

In the actual use process, both the first power generating layer 1511 and the second power generating layer 1521 can be made from the high polymer materials, which can be at least one of polydimethylsiloxane, silicon gel, polyurethane and polytetrafluoroethylene.

Furthermore, the disclosure further provides a cycle 100, which includes an electrical transmission 4 and further includes any wheel 1 provided by any one of the above embodiments, where the wheel 1 includes a friction power device 15 which is electrically connected with the electrical transmission 4 and configured to supply the electric energy to the electrical transmission 4.

Since the wheel 1 of the cycle 100 is provided with the friction power device 15, the wheel 1 can produce the electric energy continuously in the riding process of the cycle 100, and thus can supply power to the electrical transmission 4 continuously and address the drawback that the existing cycle 100 cannot supply the electric energy to the electrical transmission 4. Also, since the friction power device 15 is used to produce the electric energy, there is no need to waste any energy, and it is green, environmentally friendly and energy-saving.

In order to take full advantage of the electric energy produced by the friction power device 15, the above cycle 100 can further include an energy storing device electrically connected between the friction power device 15 and the electrical transmission 4, where the energy storing device is configured to store the electric energy produced by the friction power device 15.

When there is no need to supply power to the electrical transmission 4, the cycle light 5 and other electric appliances or the produced electric energy is greater than the electricity consumption, the electric energy produced by the friction power device 15 can be stored temporarily by the configured energy storing device, and then released to the electric appliances when needed.

The above energy storing device is a capacitance, rechargeable battery or any other electronic devices which can store the electric energy.

Evidently those skilled in the art can make various modifications and variations to the embodiments of the disclosure without departing from the spirit and scope of the disclosure. Thus the disclosure is also intended to encompass these modifications and variations to the disclosure as long as these modifications and variations come into the scope of the claims of the disclosure and their equivalents.

What is claimed is:

1. A wheel, comprising a rim and a tire covering an outer periphery face of the rim;
    the wheel further comprises a friction power device sandwiched between the rim and the tire; wherein the friction power device produces a frictional current upon being pressed by at least one of the rim and the tire;
    wherein the wheel further comprises a hub which is coaxial to the rim, spokes and a conductive slip ring;
    wherein the conductive slip ring has a rotor and a stator, wherein the stator is fixedly installed to the hub, and a shaft axis of the rotor overlaps with a shaft axis of the hub; and
    the friction power device is electrically connected with the conductive slip ring.

2. The wheel according to claim 1, wherein the friction power device comprises a first power generating unit and a second power generating unit arranged in a stack along a radial direction of the rim, wherein the first power generating unit is fixedly connected to the outer periphery face of the rim facing the tire.

3. The wheel according to claim 2, wherein the first power generating unit comprises a first power generating layer; or the first power generating unit comprises a first power generating layer and a first conductive layer arranged between the first power generating layer and the rim, and the first conductive layer is configured to fixedly connect the first power generating layer with the rim;
    the second power generating unit comprises a second power generating layer and a second conductive layer arranged in a stack along the radial direction of the rim, and the second power generating layer frictionally contacts with the first power generating layer.

4. The wheel according to claim 3, wherein both the first power generating layer and the second power generating layer are made from high polymer materials.

5. The wheel according to claim 4, wherein the high polymer materials are at least one of polydimethylsiloxane, silicon gel, polyurethane or polytetrafluoroethylene.

6. The wheel according to claim 1, wherein the spokes are insulated from the rim;
    the first power generating unit is electrically connected with the stator via the rim, and the second power generating unit is electrically connected with the rotor via the spokes.

7. A cycle, comprising an electrical transmission, wherein the cycle further comprises a wheel;
   the wheel comprises a rim and a tire covering an outer periphery face of the rim;
   wherein the wheel further comprises a friction power device sandwiched between the rim and the tire; and the friction power device produces a frictional current upon being pressed by at least one of the rim and the tire;
   wherein the friction power device is electrically connected with the electrical transmission and configured to supply electric energy to the electrical transmission;
   wherein the wheel further comprises a hub which is coaxial to the rim, spokes and a conductive slip ring;
   wherein the conductive slip ring has a rotor and a stator, wherein the stator is fixedly installed to the hub, and a shaft axis of the rotor overlaps with a shaft axis of the hub; and
   the friction power device is electrically connected with the conductive slip ring.

8. The cycle according to claim 7, further comprises an energy storing device electrically connected between the friction power device and the electrical transmission, wherein the energy storing device is configured to store the electric energy produced by the friction power device.

9. The cycle according to claim 8, wherein the energy storing device is a capacitance.

10. The cycle according to claim 7, wherein the friction power device comprises a first power generating unit and a second power generating unit arranged in a stack along a radial direction of the rim, wherein the first power generating unit is fixedly connected to the outer periphery face of the rim facing the tire.

11. The cycle according to claim 10, wherein the first power generating unit comprises a first power generating layer; or the first power generating unit comprises a first power generating layer and a first conductive layer arranged between the first power generating layer and the rim, and the first conductive layer is configured to fixedly connect the first power generating layer with the rim;
   the second power generating unit comprises a second power generating layer and a second conductive layer arranged in a stack along the radial direction of the rim, and the second power generating layer frictionally contacts with the first power generating layer.

12. The cycle according to claim 11, wherein both the first power generating layer and the second power generating layer are made from high polymer materials.

13. The cycle according to claim 12, wherein the high polymer materials are at least one of polydimethylsiloxane, silicon gel, polyurethane or polytetrafluoroethylene.

14. The cycle according to claim 7, wherein the spokes are insulated from the rim;
   the first power generating unit is electrically connected with the stator via the rim, and the second power generating unit is electrically connected with the rotor via the spokes.

* * * * *